Figures 1, 2:
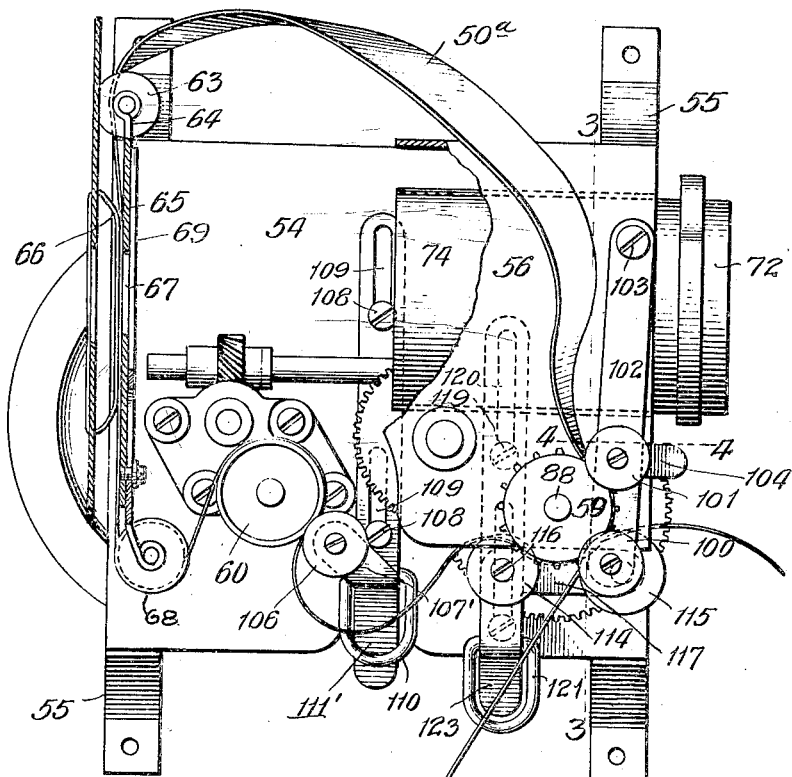

H. A. DE VRY.
MOTION PICTURE MACHINE.
APPLICATION FILED SEPT. 28, 1916.

1,382,277.

Patented June 21, 1921.
2 SHEETS—SHEET 1.

Witness:
John Enders

Inventor:
Herman A. de Vry
by Fred Gerlach
his Atty.

H. A. DE VRY.
MOTION PICTURE MACHINE.
APPLICATION FILED SEPT. 28, 1916.
1,382,277.
Patented June 21, 1921.
2 SHEETS—SHEET 2.
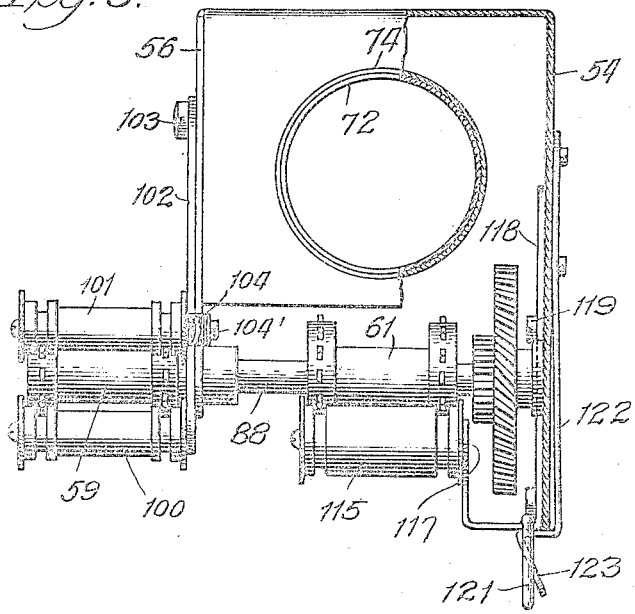
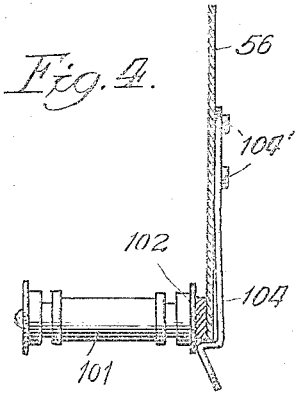
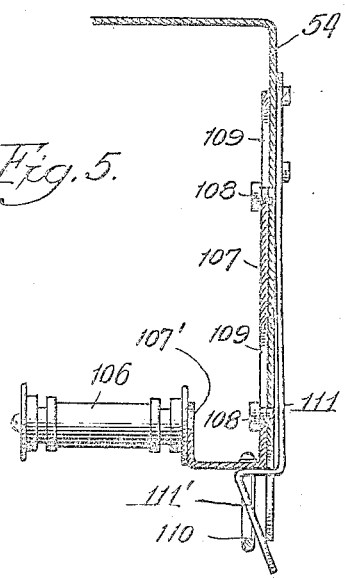
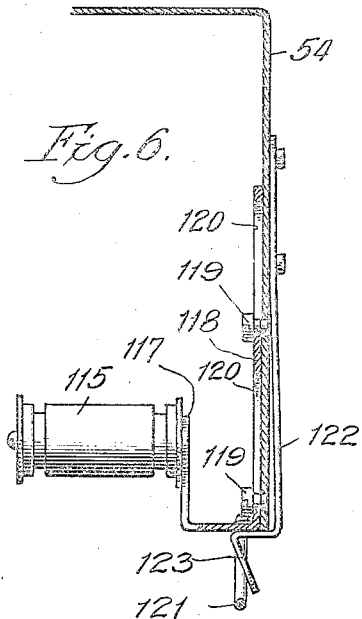
Witness:
John Enders
Inventor:
Herman A. de Vry
by Fred Gerlach
his Atty.

UNITED STATES PATENT OFFICE.

HERMAN A. DE VRY, OF CHICAGO, ILLINOIS, ASSIGNOR TO THE DE VRY CORPORATION, OF CHICAGO, ILLINOIS, A CORPORATION OF ILLINOIS.

MOTION-PICTURE MACHINE.

1,382,277.     Specification of Letters Patent.     Patented June 21, 1921.

Original application filed August 16, 1915, Serial No. 45,633. Divided and this application filed September 28, 1916. Serial No. 122,586.

*To all whom it may concern:*

Be it known that I, HERMAN A. DE VRY, a citizen of the United States, and a resident of Chicago, in the county of Cook and State of Illinois, have invented certain new and useful Improvements in Motion-Picture Machines, of which the following is a full, clear, and exact description.

The invention relates to motion picture machines and this application is a division of one filed by me August 16, 1915, Serial No. 45,633.

The object of the invention is to provide simple and easily releasable means for holding the rollers which hold the film on the feed sprockets.

The invention consists in the several novel features hereinafter set forth and more particularly defined by claims at the conclusion hereof.

In the drawings: Figure 1 is a side elevation of the film-feeding mechanism, parts being shown in section. Fig. 2 is a detail showing the roller supports on the frame for the feed-mechanism. Fig. 3 is a section taken on line 3—3 of Fig. 1. Fig. 4 is a section taken on line 4—4 of Fig. 1. Fig. 5 is a section taken on line 5—5 of Fig. 2. Fig. 6 is a section taken on line 6—6 of Fig. 2.

The several parts of the film feeding mechanism are supported by a frame comprising a side plate 54 which is secured by brackets 55 to the fixed side of the inclosing case (not shown), a side plate 56 which is suitably cross-connected to the plate 54, a back plate 65 and a front plate 57. The feed mechanism comprises a continuous feed sprocket 59, an intermittent feed sprocket 60 and a continuous take-up sprocket 61. All of these sprockets are of the double type suitable for a marginally perforated film. The axes of all of these sprockets are parallel. The framing device and guide for the film during exposure are alined with the intermittent feed sprocket 60 and the continuous take-up sprocket 61. From the sprocket 59, the film is looped and flexed laterally. The film-loop 50ª passes from the feed sprocket 59 to a guide roller 63 which is mounted in the lugs 64 on the back plate 65 of the feed mechanism frame. Thence, the film passes downwardly between said plate and resilient strips 66 which hold the film against the back of said plate as it passes across the exposure opening 67 in said plate. Thence, the film passes under a guide roller 68 mounted at the lower end of a slidable framing plate 69, thence partially around and over the intermittent feed sprocket 60, and thence to and under and partially around the take-up sprocket 61 from which it passes to the take-up (not shown).

A tube 72 containing the projecting lenses is slidably mounted in a fixed tube 74 in the front of the opening 67 in the back plate 65.

The continuous feed sprockets 59 and 61 are fixed on a shaft 88 which is mounted in the frame. Suitable gearing for continuously driving shaft 88 and for driving the sprockets 60 intermittently will be provided and an exemplification of this gearing is fully set forth in the aforesaid application Serial No. 45,633.

A pair of flanged idler rolls 100 and 101 for holding the film on the continuous feed sprocket 59 are mounted on the studs projecting laterally from an arm 102 which has its upper end pivoted at 103 to the outside of the frame plate 56. A spring catch 104 secured to the frame plate 56 at 104' is adapted to lock this arm in position to hold said idler rolls in operative relation to the double sprocket 59. The supporting arm 102 is disposed at one end of the rollers so that the other ends will be free for the threading of the film around the feed-sprocket 59. In threading or removing the film, it is only necessary to press back the latch 104 which will release the supporting arm 102 and then swing said arm forwardly, whereupon the idlers will be separated from the sprocket for edgewise insertion or removal of the film. These and all the idler rolls coöperating with the feed sprocket are grooved opposite the sprocket teeth to permit the teeth to pass through the marginal perforations in the film. Sprocket 59 is on an outwardly projecting portion of shaft 88 and this manner of supporting it permits a loop of the film to be placed laterally or edgewise between the sprocket and the idlers.

An idler roll 106 is adapted to hold the film on the intermittent feed sprocket 60. This roller is mounted on an upturned lug 107' on a bar 107 which is slidably mounted on the inner face of frame plate 54 by screws 108 and slots 109. A stirrup or loop 110 is fixed to the lower end of bar 107 and a spring latch 111 secured to the outer face of plate 54 is adapted to lock bar 107 in position to hold roller 106 in operative relation to the intermittent feed sprocket 60. The lower end of latch bar 111 is extended to form a finger piece 111' which is disposed in a stirrup 110. To release bar 107 so that it may be lowered to move idler 106 away from sprocket 60, it is only necessary to insert a finger through the stirrup 110, push the latch 111 laterally out of the stirrup and then with the same finger exert a downward pressure upon the stirrup 110. Sprocket 60 and idler 106 are also supported at one end only for edgewise insertion of the film. This device for locking the support for the idler 106 can be easily operated for the insertion and removal of the film. When the supporting bar 107 is shifted upwardly, latch 111 will spring into position to lock said bar to hold the idler in operative relation with the sprocket 60.

A pair of flanged rollers 114 and 115 are provided for holding the film on the take up sprocket 61. These rollers are mounted on studs 116 and which project laterally from an arm 117 of a bar 118 which is slidably mounted on the inner face of frame plate 54 by screws 119 in slots 120. A stirrup 121 is fixed to the lower end of bar 118 and a spring latch secured to the outer face of plate 54 is adapted to hold the supporting bar 118 and the idlers carried thereby in raised position. A finger piece 123 on the lower end of latch 122 is disposed in the stirrup 121 so that the insertion of a finger in the stirrup will release the latch so that said bar can be lowered by downward pressure of the finger. The latch will automatically lock the supporting bar when the latter is raised. This device exemplifies conveniently and quickly releasable means for unlocking the idlers 114 and 115 for edgewise insertion and removal of the film. These idlers are also supported at one end to leave the other end free for edgewise insertion and removal of the film.

The invention exemplifies simple and easily releasable means for the idlers which hold the film on the feed sprockets.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In film feeding mechanism, the combination of a sprocket, an idler for holding a film on the sprocket, a movable idler support, a spring latch provided with means to positively lock the support in position to hold the idlers in operative relation to the film, and means on the support whereby it may be shifted.

2. In film feeding mechanism, the combination of a sprocket, an idler for holding a film on the sprocket, a movable idler support, a latch provided with means to positively lock the support in position to hold the idlers in operative relation to the film, and means on the support whereby it may be shifted, the latch being coöperatively arranged so it is shiftable by a finger placed in position to operate the support.

3. In film feeding mechanism, the combination of a sprocket, an idler for holding a film on the sprocket, a movable idler support, a self-locking latch provided with means to positively lock the support in position to hold the idlers in operative relation to the film, and means on the support whereby it may be shifted, the latch being coöperatively arranged so it is shiftable by a finger placed in position to operate the support.

4. In film feeding mechanism, the combination of a sprocket, an idler for holding a film on the sprocket, a slidable support for said idler, a latch for the support and means on the support whereby it may be shifted.

5. In film feeding mechanism, the combination of a sprocket, an idler for holding a film on the sprocket, a slidable support for said idler, a latch for the support, and means on the support whereby it may be shifted, the latch having a part disposed so that it can be shifted by the finger and placed in position to engage the shifting means.

6. In film feeding mechanism, the combination of a sprocket, an idler for holding a film on the sprocket, a movable idler support, a latch provided with means to positively lock the support and a stirrup on the support.

7. In film feeding mechanism, the combination of a sprocket, an idler for holding a film on the sprocket, a slidable idler support, a self locking latch for locking the support, and a stirrup on the support.

8. In film feeding mechanism, the combination of a sprocket, an idler for holding a film on the sprocket, a slidable idler support, a self-locking latch for locking the support, and a stirrup on the support, the latch having a part disposed to be operable through the stirrup.

HERMAN A. DE VRY.